United States Patent
Viti et al.

[11] Patent Number: 5,969,491
[45] Date of Patent: Oct. 19, 1999

[54] DETECTION OF INSTANTANEOUS POSITION OF THE ROTOR OF A BRUSHLESS DC MOTOR DRIVEN IN A TRIPOLAR MODE

[75] Inventors: Marco Viti, Sesto S. Giovanni; Michele Boscolo, Sottomarina; Alberto Salina, Limbiate, all of Italy

[73] Assignee: STMicroelectronics S.r.l., Agrate Brianza, Italy

[21] Appl. No.: 09/115,055

[22] Filed: Jul. 14, 1998

[30] Foreign Application Priority Data

Jul. 15, 1997 [EP] European Pat. Off. .............. 97830353

[51] Int. Cl.$^6$ ..................................................... H02K 23/00
[52] U.S. Cl. ........................ 318/254; 318/138; 318/439; 318/430; 318/431; 318/721; 318/722; 318/802
[58] Field of Search ..................................... 318/254, 138, 318/439, 430, 431, 721, 722, 802

[56] References Cited

U.S. PATENT DOCUMENTS

| 4,364,004 | 12/1982 | Bourbeau | 318/721 |
| 4,922,169 | 5/1990 | Freeman | 318/254 |

FOREIGN PATENT DOCUMENTS 0 363 169 A2  4/1990  European Pat. Off. .......... H02P 6/02
0 482 913 A2  4/1992  European Pat. Off. .......... H02P 6/02

OTHER PUBLICATIONS

Patent Abstracts of Japan, vol. 10, No. 125 (E–402) '2182!, May 10, 1986 & JP 60 257791 A (Hitachi Seisakusho K.K.), Dec. 19, 1985.

Patent Abstracts of Japan, vol. 97, No. 6, Jun. 30, 1997 & JP 09 047075 A (Matsushita Electric Industrial Co., Ltd.), Feb. 14, 1997.

Uhrig, C., "Trapez–Oder Sinusansteuerung?" Elektronik, vol. 38, No. 7, Mar. 31, 1989, pp. 116–118, p. 117, col. 1, paragraph 2.

*Primary Examiner*—Karen Masih
*Attorney, Agent, or Firm*—Allen, Dyer, Doppelt, Milbrath & Gilchrist, P.A.

[57] ABSTRACT

The sensing of the rotor position for synchronizing the drive of a multi-phase brushless motor when driven in a "multi-polar" mode is carried out by interrupting the driving current in at least one of the windings of the motor coupled with a zero-cross sensing circuit of the BEMF signal. This done by using a first logic signal, enabling a logic gate for asserting a zero-cross event detected by the circuit by a third logic signal, and simultaneously resetting the first signal and the third signal after a certain period of time from the instant of interruption.

52 Claims, 9 Drawing Sheets

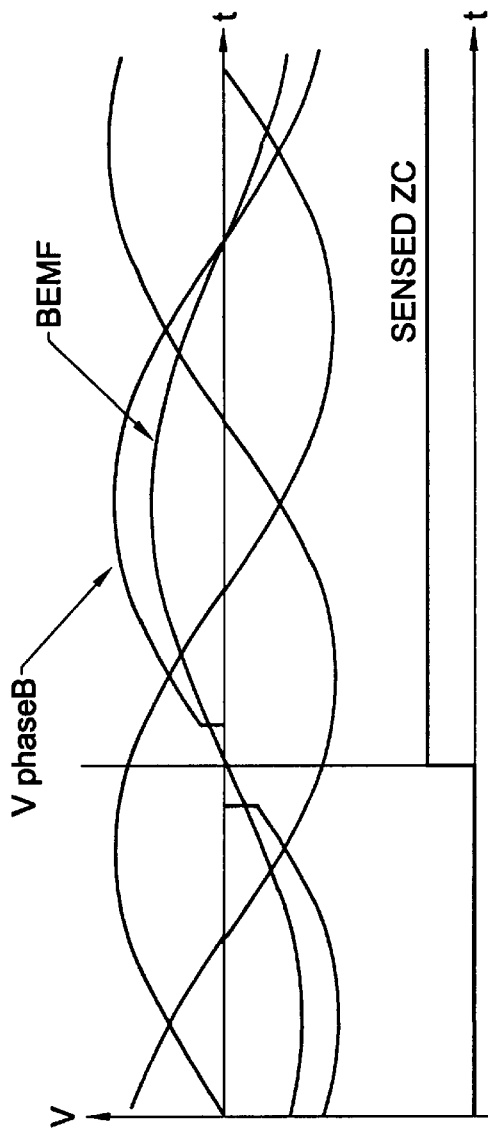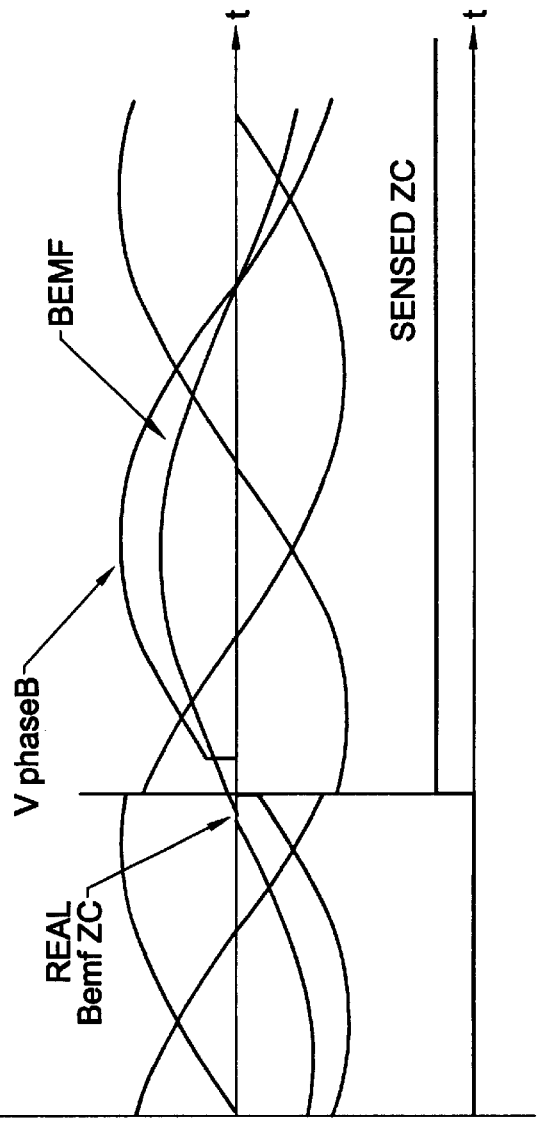

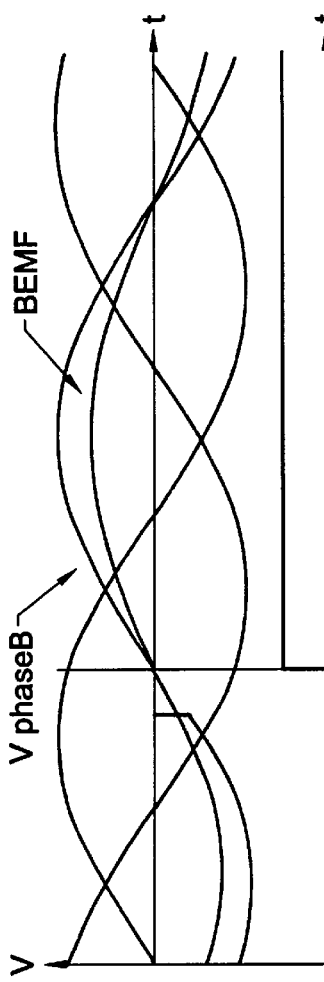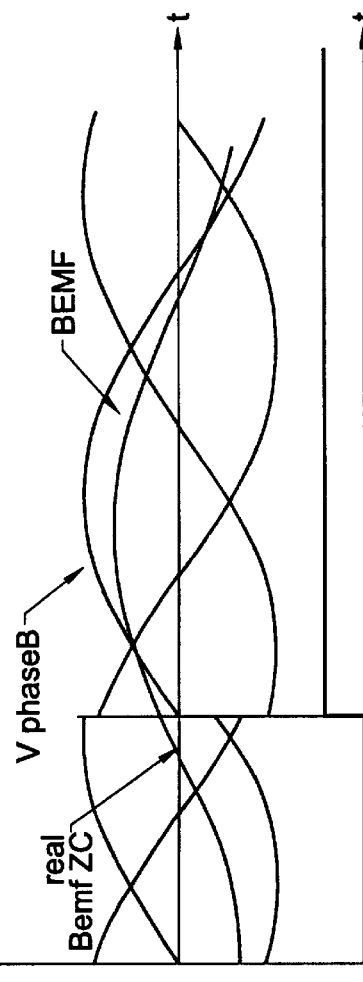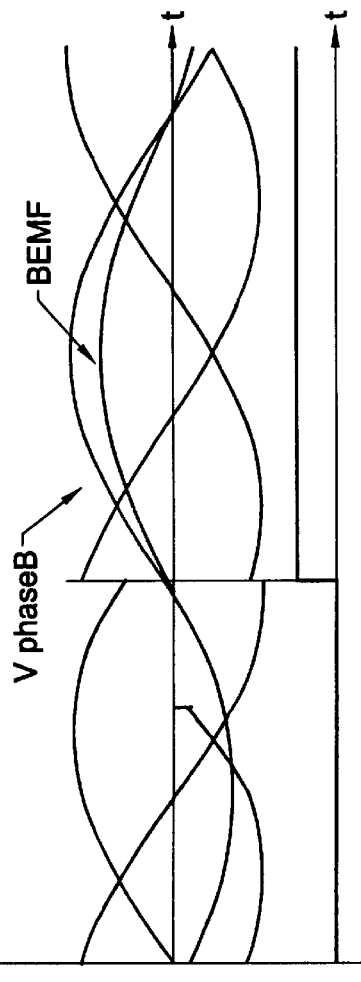

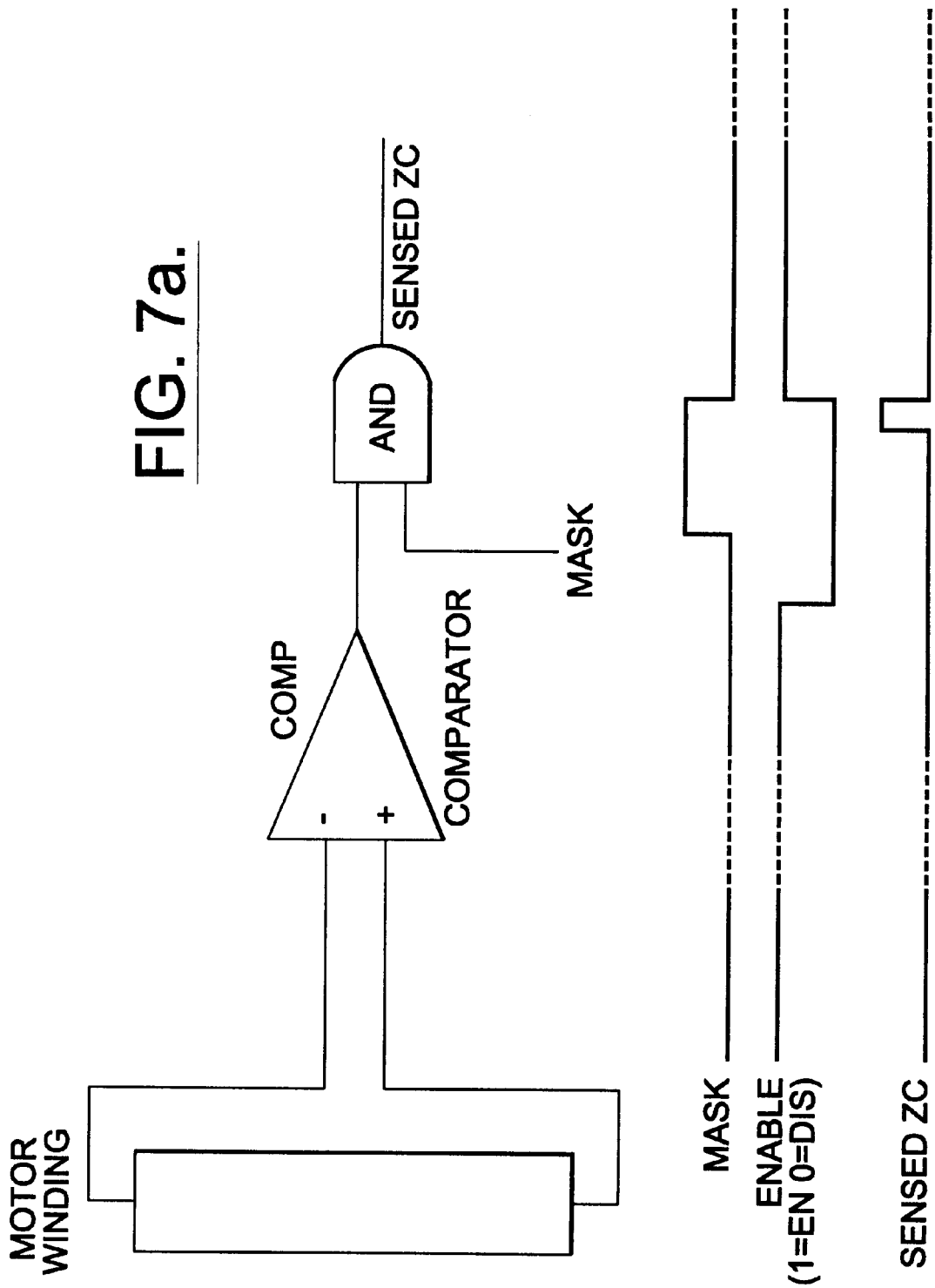

DETECTION OF INSTANTANEOUS POSITION OF THE ROTOR OF A BRUSHLESS DC MOTOR DRIVEN IN A TRIPOLAR MODE

FIELD OF THE INVENTION

The present invention relates to brushless DC motors, and, more particularly, to a method for sensing the rotor's position which is necessary for driving the motor.

BACKGROUND OF THE INVENTION

A "brushless" motor includes a permanent magnet rotor and a stator made up of a number of windings that may be connected in a star configuration, or completely independent from each other. In the first case there exist a number of external terminals equal to the number of motor's phases (eventually +1 if the star center must be accessed). In the second case reference is made to motors with independent phases and both terminals of each winding are available externally. These motors are commonly used in hard and floppy disk drives, DVD (digital video disk) drives, in tape video recorders, CD players, etc.

In the majority of cases, brushless motors are three-phase and the driving circuit generally comprises integrated circuits whose output stages drive the phase windings. The integrated circuits may either comprise a three-phase full-wave half-bridge circuit in the case of motors connected in a star configuration, or three full-bridge circuits in the case of independent phase motors.

FIG. 1a shows a three-phase independent phase brushless motor and the relative independent full-bridge output stages that drive the respective windings. FIG. 1b illustrates the output stage required for driving a three-phase brushless motor with windings connected in a star configuration.

By way of simplification, let us consider the typical case of a three-phase motor driven in a bipolar mode in which, at each instant, two phase windings are powered, while the third phase winding is momentarily unpowered (full-bridge or half-bridge output node in a state of high impedance). The phase windings are switchingly driven according to a cyclical sequence which must be synchronized with the rotor's instantaneous position. In a bipolar driving mode, the position may be determined by analyzing the back-electromotive-force (BEMF) monitored on the winding that is momentarily unpowered, or sensed by Hall-effect sensors (a more expensive approach that is seldom used). Normally, such a BEMF monitoring detects the zero crossing of the BEMF that has a sinusoidal or in any case periodic waveform, generally referred to as "zero-cross" instant. The time interval between two successive zero-crosses is indicated with Tc.

Alternative driving modes for this type of motor are, respectively, the so-called unipolar mode and the tripolar mode. In the unipolar mode the sensing of the rotor's position may be made in the same way as in the bipolar mode. In the tripclar mode the sensing of the rotor's position cannot be made according to the above noted techniques because all of the motor's windings are always powered. In fact, in a tripolar mode three voltages (or currents), generally sinusoidal, out-of-phase by 120 electrical degrees among each other, and generating a stator rotating field, are forced on the three windings, respectively, of a three-phase motor.

In a tripolar mode, the sensing of the rotor's position generally requires the use of sensors or of electronic circuits that provide a de-facto "reconstruction" of the induced BEMF voltage on the windings, once the motor's electrical parameters are known. An approach of this type is disclosed in the European patent application No. 96830440.2 assigned to the assignee of the present invention.

Information on the rotor's instantaneous position is necessary for driving a synchronous motor, such as a brushless motor. It is fundamental for optimizing the driving because the system's efficiency is a function of the phase relationship between the driving voltage (or current) and the rotor's position.

The methods for monitoring the instantaneous rotor's position used in a bipolar or in an unipolar driving mode are unsuitable in the case of a tripolar mode. This is so because each winding is constantly subjected to a driving voltage, thus impeding the monitoring of the BEMF induced on the winding. According to the prior art, this inability was addressed by employing position sensors, for example, Hall effect sensors or, as an alternative, relatively complex electronic circuits capable of reconstructing a BEMF signal once the motor's electrical parameters (resistance and inductance) are known.

SUMMARY OF THE INVENTION

It is therefore an object of the present invention to provide a sensing system of the rotor's position of a multi-phase brushless DC motor, driven in a mode so as to have all its phase windings powered. This object is achieved based on generating a temporal or time window of brief duration during which the output node of one of the continuous half-bridge stages that drive the respective windings is set co a state of high impedance (or one of the full-bridges in the case of driving a motor having independent phase windings), thus permitting a BEMF detection in the particular phase winding connected to it.

The time window may have a constant duration independent of the actual speed of the motor, or a variable duration dependent on the motor's speed or, according to a preferred embodiment, a variable duration dependent on other parameters. These other parameters may be, for example, the actual instant of sensing a BEMF zero-cross and the correctness of such a sensed zero-cross instant with respect to the expected instant.

The method of this invention is applicable to both current-mode and voltage-mode driving independent of the periodic waveform of the driving current or voltage used. The method may comprise the steps of:

interrupting the driving current: in at least one of the phase windings of the motor, for example, by placing the output node of the respective driving stage in a condition of high impedance (tristate) by means of a first logic command (ENABLE);

enabling a logic gate asserting a zero-cross event sensed by the sensing circuit after a certain time from the instant of interrupting by means of another logic command (MASK); and resetting both the logic commands (ENABLE and MASK) upon the assertion of a zero-cross event by the logic gate.

According to an alternative embodiment contemplating a preliminary amplification stage of a sensed BEMF signal before feeding it to the input of a comparator detecting a zero-cross of the BEMF signal, the method of the invention may include the steps of:

interrupting the driving current in at least one of the phase windings of the motor, for example, by placing the output node of the respective driving stage in a condition of high impedance (tristate) by means of a first logic command (ENABLE);

short-circuiting the inputs of a. differential amplifier amplifying a BEMF voltage sensed on the winding for a preestablished interval of time starting from the instant of the interrupting of the driving current by means of a second logic command (SWITCH)

enabling a logic gate asserting a zero-cross event sensed by a dedicated sensing circuits after a certain time from the instant of the interrupting, by means of a third logic command (MASK); and resetting both of the logic commands (ENABLE and MASK) upon the assertion of a zero-cross event by the logic gate.

BRIEF DESCRIPTION OF THE DRAWINGS

The different aspects and advantages of the method of the invention will become even more evident through the following description of some preferred embodiments and by referring to the attached drawings, wherein:

FIG. 4a shows the drive voltage and BEMF signals relative to a motor's phase winding when the period Tc is correctly estimated with a temporal or time window of constant duration and the zero-cross assertion signal occurring in the temporal window;

FIG. 4b shows the same signals of FIG. 4a in a case of an over-estimation of the time period Tc;

FIG. 5a represents the drive voltage and BEMF signals relative to a motor's phase winding when the period Tc is correctly estimated with a temporal window of variable duration as a function of the zero-cross sensing instant and of a correct and incorrect estimate of the zero-cross instant;

FIG. 5b represents the drive voltage and BEMF signals relative to a motor's phase winding when over estimating the period Tc with a temporal window variable duration as a function of the zero-cross sensing instant and of a correct and incorrect estimate of the zero-cross instant;

FIG. 5c represents the drive voltage and BEMF signals relative to a motor's phase winding when over estimating the period Tc with a temporal window variable duration as a function of the zero-cross sensing instant and of a correct and incorrect estimate of the zero-cross instant;

FIG. 7a is a circuit diagram of the BEMF DETECT CIRCUIT block of FIG. 6 according to a first embodiment of the invention.

DETAILED DESCRIPTION OF THE PREFERRED EMBODIMENTS

For analyzing the operating principle of the invention let us consider a most common type of brushless motor, the three-phase one. The described concepts remain, however, applicable to any multi-phase brushless motor with phase windings connected in a star configuration or independently connected, driven either in a voltage-mode or in a current-mode according to any predefined periodic waveform. As previously cited, the brushless motor is a "synchronous" one and this implies the necessity of forcing driving currents through the motor's phase windings synchronously to the rotor's position. This is to maximize the torque produced at the shaft, therefore synchronously to the BEMF signals induced in the respective phase windings.

Figure 1A:
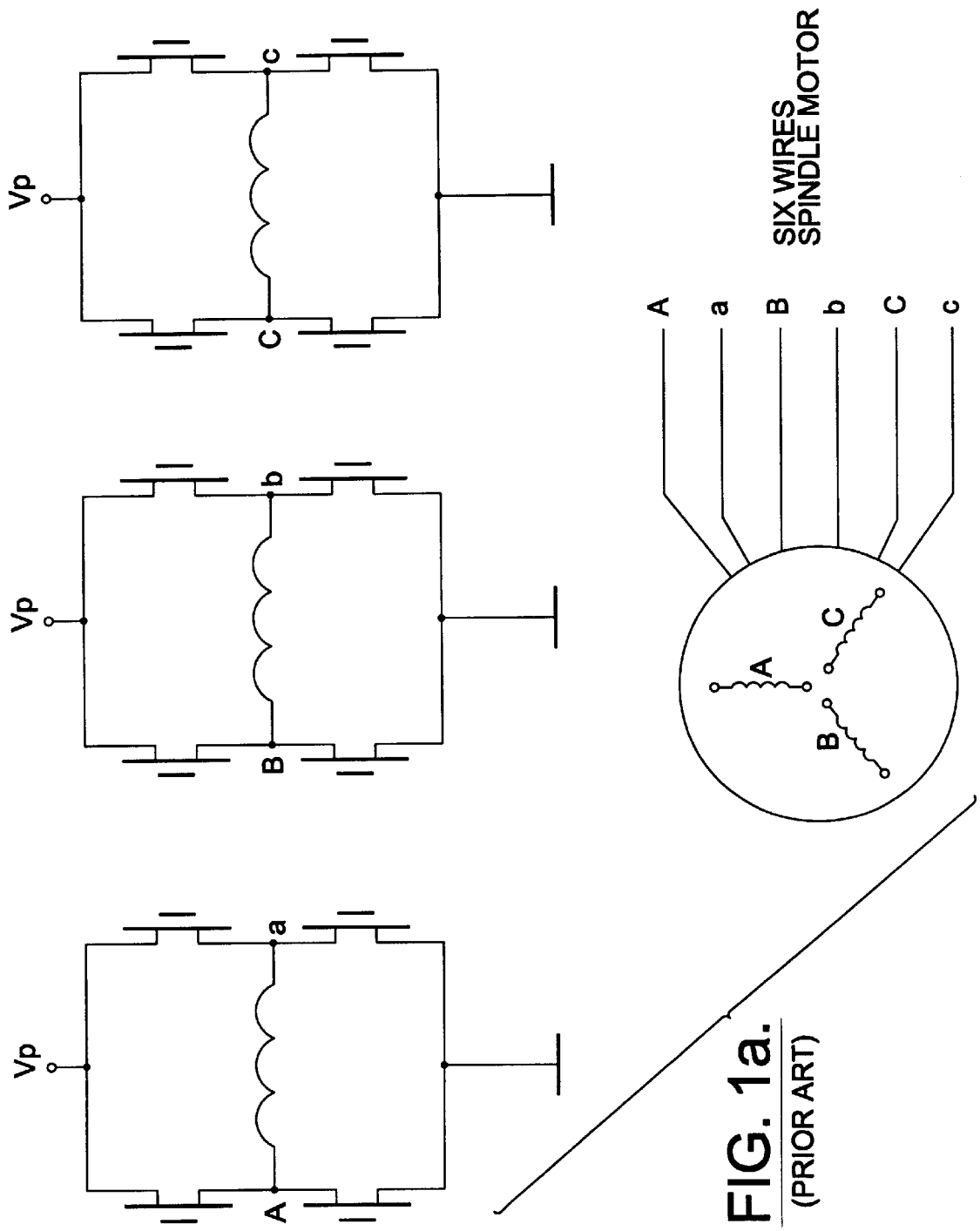
FIG. 1a shows a power stage including three full-bridges used for driving three-phase brushless DC motors with independent phase windings as in the prior art.
Figure 1B:
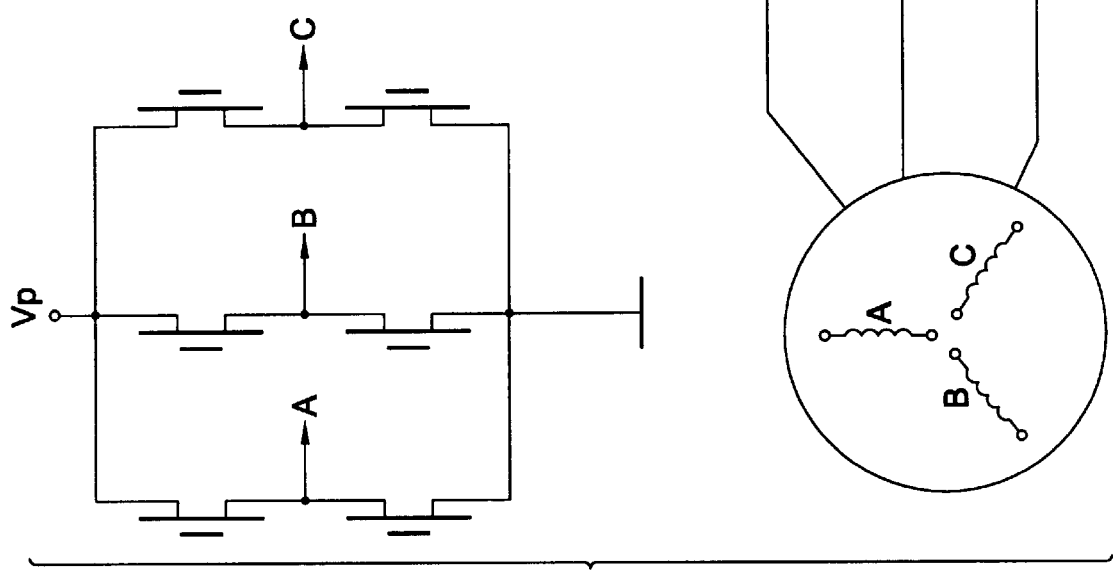
FIG. 1b shows a three-phase full-wave half-bridge power stage driving a three-phase brushless DC motor with phase winding connected in a star configuration as in the prior art.
Figure 2:
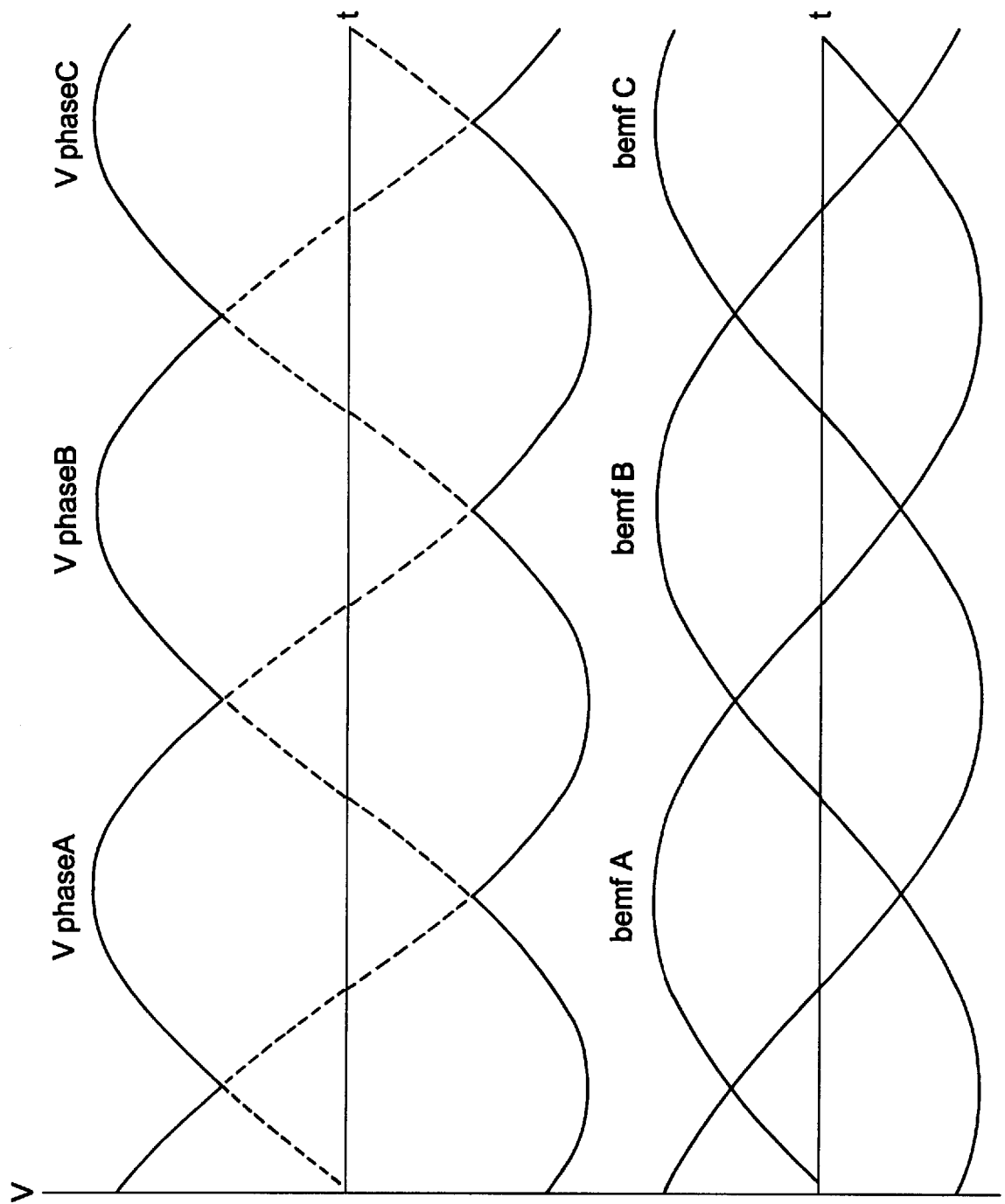
FIG. 2 shows the sinusoidal driving signals (voltages or currents), applied to the respective motor windings and the relative BEMF signals induced on the windings by the rotor's rotation as in the prior art.

FIG. 2 shows three driving signals (V phase A, V phase B and V phase C), in the example considered having a sinusoidal profile, which are applied to the respective windings. The choice of a sinusoidal waveform is not the only possible waveform. Other periodic waveforms, such as a trapezoidal waveform, may also be used.

In voltage mode the signals represent voltages, while in current mode the signals represent currents forced through the respective phase windings. of course, in either case it is fundamental to obtain the maximum torque to ensure synchronism of the currents flowing through the phase windings with the rotor's position, that is, with the BEMF voltages induced in the windings by the rotor's rotation. This is done by considering that in the case of a voltage-mode driving there exists a certain phase angle between the drive voltage applied to the windings and the relative currents flowing through them.

As far as the addressed problems and the approach provided by this invention, this distinction between voltage and current modes is substantially irrelevant and in the ensuing description driving signals will not be identified as being either voltage or current signals. Indicatively, FIG. 2 conventionally shows the relative back-electromotive-force signals (bemfA, bemfB and bemfC) in phase with the driving signals.

More generally, for each sensed zero-cross of an induced back-electromotive-force signal, it is necessary to set the driving signal or signals in a manner to keep, between the two type of signals, a certain optimal phase angle (that can be null in the case of current mode signals). To simplify the ensuing descriptions, it will be assumed to keep in phase the driving signal with a zero-cross assertion signal of the BEMF voltage monitored on at least one of the phase windings.

The method of detecting the rotor's position of this invention may be implemented alternately either by realizing a temporal or time window of constant duration or a temporal or time window whose duration is a function of the motor's speed, or a temporal or time window whose duration is a function of the instant of detection of a zero-cross (which event determines the end of the temporal window) and of a correct or incorrect estimate of the zero-cross instant (which estimate determines the beginning of the temporal window). Each type of temporal window is applicable in monitoring the BEMF on a single phase winding (sensing of the zero-cross in only one phase winding) or in monitoring the BEMF on different phase windings (sensing of the zero-cross on several or on all the phase windings). Moreover, it is applicable only once per electrical period (sensing of one zero-cross for each BEMF electrical period) or twice per electrical period (sensing of the zero-cross for both positive and negative gradient of the BEMF for each electrical period).

Therefore, in a three-phase motor, the number of temporal windows that may be implemented may range from one per electrical period (a window per period and for a signal winding) to a maximum of six per electrical period (two windows per period and for all three windings). FIGS. 3a, 3b, 3c, 3d illustrate some examples of realization of such a temporal window.

Figure 3A:
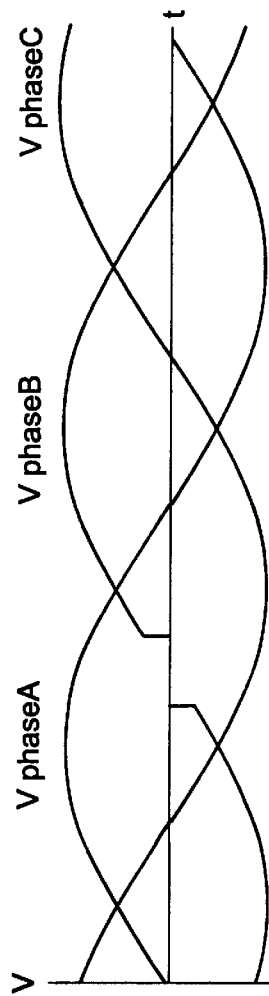
FIG. 3a shows a possible temporal or time window implementation on a single phase, once per electrical period, according to the method of the invention.
Figure 3B:
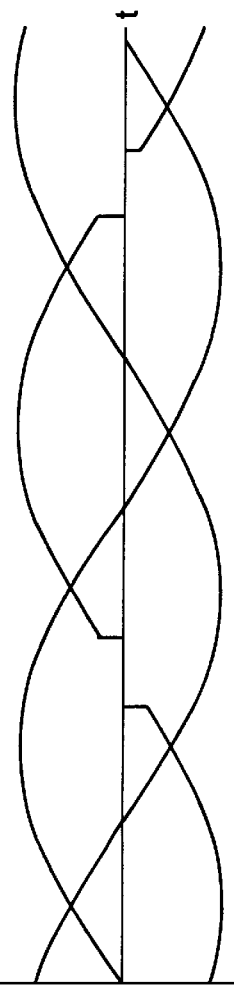
FIG. 3b shows an alternative temporal or time window implementation on a single phase, twice per electrical period, according to the method of the invention.
Figure 3C:
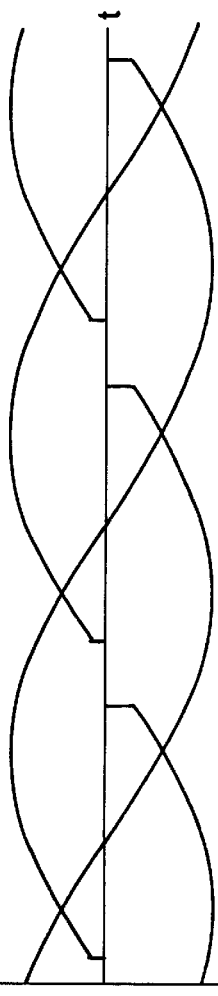
FIG. 3c shows an alternative temporal or time window implementation on all three phases, once per electrical period, according to the method of the invention.
Figure 3D:
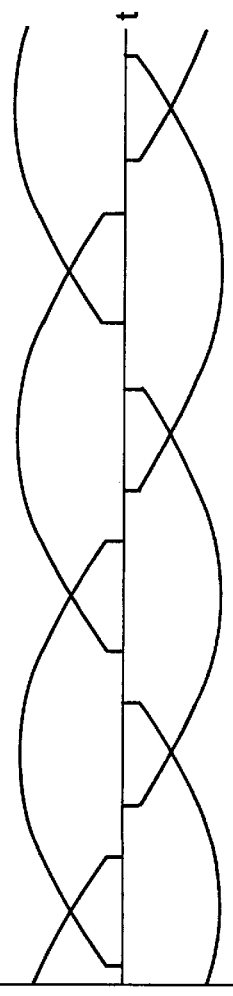
FIG. 3d shows an alternative temporal or time window implementation on all three phases, twice per electrical period, according to the method of the invention.

FIG. 3a illustrates the case of a temporal window in the driving of a phase winding, realized once every electrical period. FIG. 3b illustrates the case of a temporal window in the driving of a single phase winding, realized twice every electrical period. FIG. 3c illustrates the case of a temporal window in the driving of all three windings, realized once every electrical period. FIG. 3d illustrates the case of a temporal window realized twice every electrical period in the driving of all three windings.

Let us consider the case of a temporal window realized for a single winding once every electrical period and that the zero-cross to be sensed is relative to a positive gradient of the BEMF signal. The following considerations remain, however, applicable also to any other case. Let us further assume to be driving the motor in a voltage mode according to a predefined sinusoidal voltage profile, in phase with the BEMF signal, and to be at the end of a start-up phase, that is, in a situation where the BEMF has already assumed a sufficiently large amplitude to be detectable by ordinary comparator means.

I° Case: Window of Constant Temporal Duration

By assuming to know the value of the last Tc (period of time between two successive zero-cross events) at the end of the start-up, a condition that may be easily assured by setting a sufficiently ample temporal window, it is possible to forecast with a sufficient precision the instant when the next zero-cross shall occur, and, therefore, of the new Tc value. Eventual forecast errors would be essentially due to imprecisely estimated acceleration or deceleration. However, these errors may be recovered by monitoring the BEMF "level" rather than its zero-crossing.

If, as supposed, a single window every BEMF's electrical period looking for its zero-crossing with positive gradient is implemented, a positive BEMF value, at the instant of the opening of the temporal window, is possible only if the new Tc was over estimated, that is, when the zero-cross (ZC) occurs before the start of the temporal window. This error can be partially recovered by monitoring the level of the BEMF, rather than it zero-cross. The expression "SENSED ZC" refers to the signal representative of the BEMF level. The occurrence of a situation as the above (zero-cross occurring before the start of the temporal window) is used for estimating the new Tc and, hence, for choosing the starting instant of the next temporal window.

FIG. 4a shows the BEMF and the driving signal relative to a phase winding for the case of a correct Tc estimate with a temporal window of constant duration. As observed in FIG. 4a, the BEMF zero-cross is detected within the temporal window. FIG. 4a also reports the "SENSED ZC" signal on the rising front of which (because the BEMF zero-cross being looked for is the one with a positive gradient) it is be assumed that the zero-cross has occurred. Obviously, the updating of the SENSED ZC signal takes place within the temporal window where it is assumed that the zero-cross occurs. In the case of a correct Tc estimate such a SENSED ZC signal is perfectly in phase with the zero-cross signal.

FIG. 4b shows the driving and BEMF signals relative to a phase winding for the case of an over estimation of Tc. The SENSED ZC signal will assume a high logic level at the instant of opening of the temporal window because the zero-cross event has already occurred.

Based on the above, it is possible, once the likely values of the accelerations are estimated for the particular application, to set a window of constant temporal duration for sensing of BEMF zero-cross as it occurs or with a negligible delay in case of estimating errors of the Tc value.

II° Case: Window of Temporal Duration as a Function of the Motor's Speed

The method remains similar to the one described for the preceding case with the only modification of the window temporal duration that is a function of the speed of the motor. For example, it may be established to realize a window the temporal duration of which is equal to a fixed percentage of the current Tc value.

III° Case: Window of Temporal Duration as a Function of the Zero-cross Instant and of Its Correct or Incorrect Forecast Also in this case, the start of the window is defined according to the same mechanisms as in the two preceding cases, that is, by estimating the instant when the next zero-cross is expected to occur. To facilitate a recovery in case of an under estimation of the accelerations, it is still possible to monitor and analyze the BEMF level, and not just its passage through the zero level.

According to this embodiment, the occurrence of the BEMF zero-cross before the window opens serves to estimate the new Tc, and, thence, to define the starting instant of the next window. In this embodiment, the closing instant of the window depends on the zero-cross occurrence itself. The window is terminated at a certain instant tied to the sensing instant of the zero-cross. The window may terminate at the zero-cross instant or after a preestablished delay.

Thereby, by using the SENSED ZC signal and waiting for its zero-cross to command the closing of the window, besides under estimations of accelerations also accidental deceleration are easily recoverable because, once a temporal window is started, it remains open until a zero-cross is detected. In the case of a deceleration this will take place with a certain delay after the forecast instant.

If at the opening of the window the BEMF level indicates that the expected zero-cross has already taken place, besides an instantaneous updating of the SENSED ZC signal, it is also defined at which instant the window will terminate. Therefore, the window duration will be determined by the precision with which the zero-cross instant is forecast.

FIGS. 5a, 5b, and 5c illustrate the functioning according to this embodiment, for the case of a correct estimation of an over estimation and of an under estimation of the new Tc, respectively, for the case in which the end of window is set to coincide with the rising front of the SENSED ZC signal. This particularly preferred embodiment has the advantage of a substantial absence of critical aspects even during unforeseen accelerations and decelerations of the motor.

Figure 6:
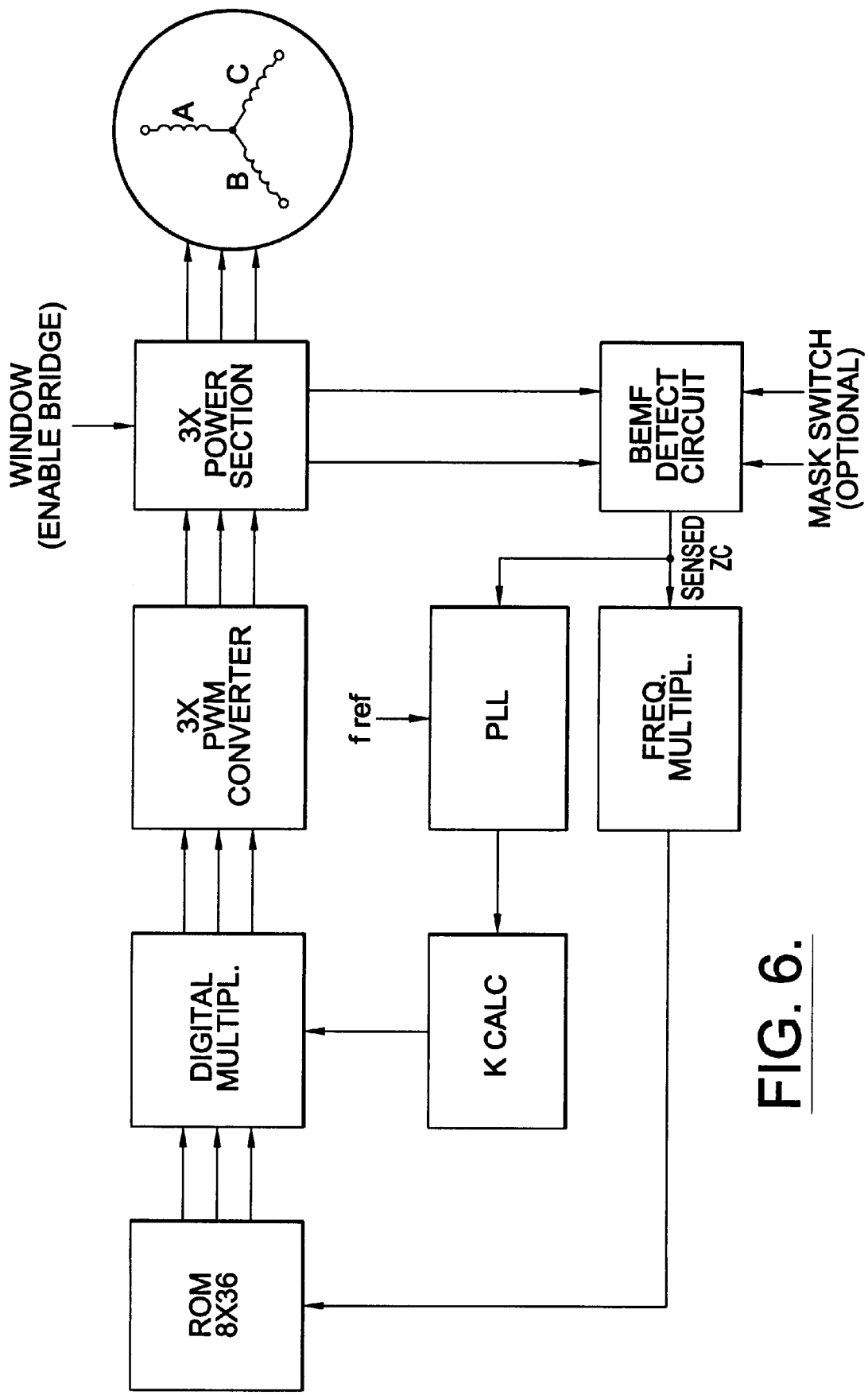
FIG. 6 is a block diagram of a circuit implementing the method of the invention.

FIG. 6 shows the block diagram of a circuit implementing the method of the invention for driving a brushless motor.

The diagram refers to the case of a completely digital voltage mode driving, according to which the voltage profiles that are applied to the motor's windings are permanently stored in a ROM memory.

The diagram is a simplification of the one described in the European patent application No. 96830295.0 dated May 22, 1996, assigned to the assignee of the present invention. The main functions of the various blocks may be indicated as follows. The "ROM" block contains the samples of the desired waveform to be applied to the motor's windings. By supposing to have 36 digital samples to approximate the waveform and to require an 8-bit resolution, then an 8×36 memory will be required.

The block "DIGITAL MULTIPLE." multiplies by a constant the digital datum output by the ROM. The constant is calculated by the "K CALC" block as a function of the signal output by the "PLL" block, wherein an error signal between the real and the reference speed is generated. The "PWM CONVERTER" block converts a digital value (byte) into a duty-cycle (PWM). A PWM signal that reproduces the sample value that in that moment is pointed to the ROM memory, multiplied by KVAL, is output.

The "FREQUENCY MULTIPLE." block multiplies by 36 the motor's electric frequency (1/Tc). This is necessary because this signal will be used for scanning the ROM memory which stores the voltage profiles (since there are 36 samples, the scanning must occur at a frequency 36 times greater than the motor's electric frequency).

Figure 7B:
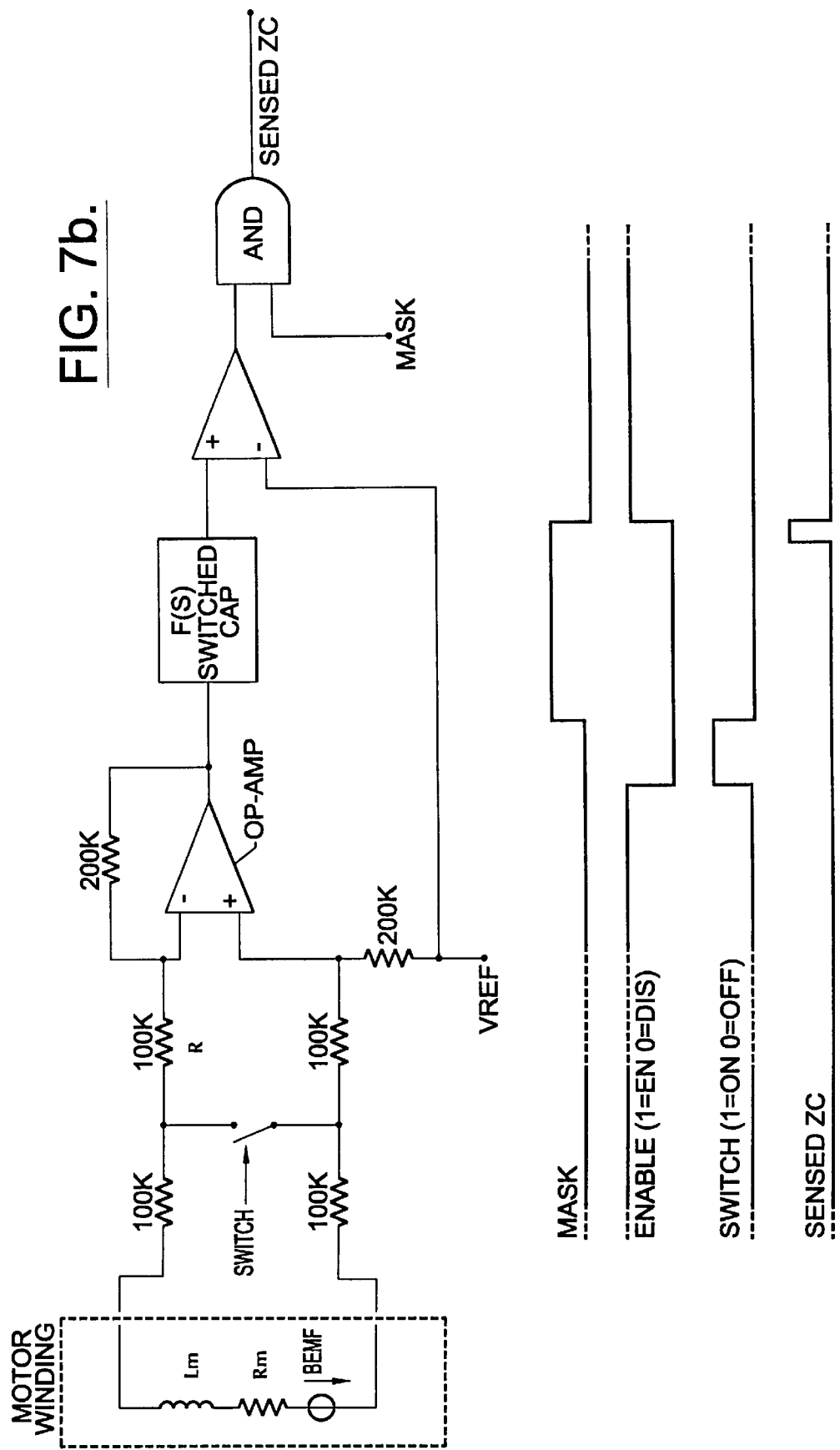
FIG. 7b is a circuit diagram of the BEMF DETECT CIRCUIT block of FIG. 6 according to another embodiment of the invention.

The "WINDOW" signal sets the bridge (or half-bridge) output in a state of high impedance, thus allowing for the zero-cross sensing of a BEMF induced on the winding, which event will be manifested at the output of the "BEMF DETECT CIRCUIT", and affirmed by the logic AND gate, as shown in more detail in the embodiments of FIGS. 7a and 7b.

In a more general case of simply employing a comparator COMP for detecting a zero-cross of the sensed BEMF signal, as depicted in FIG. 7a, the block BEMF DETECT CIRCUIT receives the "MASK" signal whose purpose is that of masking spurious assertions of a zero-cross event in correspondence with the beginning of the temporal window that may be caused by an abrupt interruption of the current in the winding.

In applications where the BEMF signal has a particularly low amplitude and/or in exceptionally noisy conditions, an amplifying stage OP-AMP followed by a low-pass filter F(S) may be used for feeding to the input of the comparator COMP an amplified and filtered BEMF signal, as depicted in FIG. 7b.

In such an embodiment, to prevent, spurious assertions that could be due to noise induced by the abrupt current interruption in a motor winding and for preventing excessively large signals at the input of the operational amplifier OP-AMP during the masking period, a third logic command "SWITCH" may be employed to short-circuit the inputs of the sensing operational amplifier during the masking interval following the activation of the ENABLE command.

Of course, in many situations, the use of an operational amplifier and of a low pass filter and eventually also of the relative disabling command SWITCH may not be necessary and the BEMF signal may be fed directly to the inputs of the comparator COMP, as depicted in FIGS. 7a and 7b.

For a fully digital system as the one taken into consideration, an efficient temporal window may be realized as follows:

from the forecast instant for a new zero-cross, the window may be set to begin in correspondence with the "n" sample (where n ranges from 1 to 36 as shown in FIG. 6). A zero-cross sensing is then waited for before terminating the window. Thereafter, if the BEMF zero-cross occurs within the window (that is following a correct estimation of the Tc) the next window opening will be set to occur in correspondence with the "n+1 sample".

If for a temporal window a zero-cross has already occurred, the window will be immediately closed and the SENSED ZC updated as previously described. The occurrence of such a condition will cause the next temporal window to initiate in correspondence with the sample n−1. This results in automatic sizing and positioning of the window along the time axis. Hence, a mechanism will be active whereby the temporal window will undergo a continuous adjustment about its precise coincidence with the zero-cross event. This mechanism may be checked by fixing a minimum duration of the window.

In a system using 36 samples, when the zero-cross occurs in the proximity of the last sample, the window may be set to begin not earlier than the 34th sample. Any type of temporal window may be realized only for one phase winding (sensing of the zero-cross on a single motor's phase winding) or for more windings (sensing of the zero-cross on more motor phase windings). It may be realized only once per electrical period or twice per electrical period (for sensing the zero-cross events with both positive and negative gradients every BEMF electrical period).

The technique of the invention is applicable to any multi-phase brushless motor, with the windings connected in a star configuration or connected independently, driven in voltage-mode or in current-mode and for any predefined waveform.

That which is claimed is:

1. A method for sensing position of a rotor of a multi-phase brushless motor using at least one zero-cross detecting circuit for voltage induced on a respective phase winding of the motor driven in a multi-polar mode using at least one driving stage, the at least one zero-cross detecting circuit comprising a differential amplifier, the method comprising the steps of:

interrupting a driving current of at least one of the phase windings of the motor coupled to a respective zero-cross detecting circuit by placing in a high impedance state an output of a respective driving stage using a first logic signal;

closing for a predetermined time beginning with a switching instant of the first logic signal a short-circuiting switch for inputs of the differential amplifier of the at least one zero-crossing detecting circuit using a second logic signal;

enabling an asserting logic gate of a zero-cross event detected by the zero-cross detecting circuit starting from an instant of re-opening of the short-circuiting switch using a third logic signal; and resetting the first logic signal and the third logic signal a period of time after the interrupting.

2. A method according to claim 1, wherein the step of resetting occurs after a period of time proportional to an instantaneous speed of the motor.

3. A method according to claim 1, wherein the step of resetting occurs upon an output of an assertion signal of a zero-cross detection by the asserting logic gate.

4. A method according to claim 1, further comprising the step of coupling each phase winding to a respective zero-cross detecting circuit.

5. A method according to claim 1, wherein the step of interrupting comprises causing the first logic signal to have a constant and predetermined duration.

6. A method according to claim 5, wherein the step of causing the first logic signal to have a constant and predetermined duration comprises causing the first logic signal to have a duration equivalent to a constant and predetermined percentage of a phase switching frequency of the motor.

7. A method according to claim 1, wherein the step of interrupting is for a time duration dynamically regulated as a function of a correct or incorrect forecast of a next zero-cross instant.

8. A method for sensing position of a rotor of a multi-phase brushless motor using a zero-cross detecting circuit for respective phase windings of the motor driven in a multi-polar mode by respective driving stages, each zero-cross detecting circuit comprising a differential amplifier, the method comprising the steps of:

interrupting driving of at least one of the phase windings of the motor by placing in a high impedance state an output of a respective driving stage using a first logic signal;

closing for a predetermined time beginning with a switching instant of the first logic signal a short-circuiting switch for inputs of the differential amplifier of the at least one zero-crossing detecting circuit using a second logic signal;

enabling an asserting logic gate of a zero-cross event detected by the zero-cross detecting circuit starting from an instant of re-opening of the short-circuiting switch using a third logic signal; and resetting the first logic signal and the third logic signal a period of time after the interrupting.

9. A method according to claim 8, wherein the step of resetting occurs after a period of time proportional to an instantaneous speed of the motor.

10. A method according to claim 8, wherein the step of resetting occurs upon an output of an assertion signal of a zero-cross detection by the asserting logic gate.

11. A method according to claim 8, further comprising the step of coupling each phase winding to a respective zero-cross detecting circuit.

12. A method according to claim 8, wherein the step of interrupting comprises causing the first logic signal to have a constant and predetermined duration.

13. A method according to claim 12, wherein the step of causing the first logic signal to have a constant and predetermined duration comprises causing the first logic signal to have a duration equivalent to a constant and predetermined percentage of a phase switching frequency of the motor.

14. A method according to claim 8, wherein the step of interrupting is for a time duration dynamically regulated as a function of a correct or incorrect forecast of a next zero-cross instant.

15. A method of sensing a position of a rotor of a multi-phase brushless motor using at least one zero-cross detecting circuit for a respective phase winding of the motor driven in a multi-polar mode using at least one driving stage, the at least one zero-cross detecting circuit comprising a differential amplifier, the method comprising the steps of:

interrupting driving of at least one of the phase windings of the motor by placing in a high impedance state an output of a respective driving stage using a first logic signal, the interrupting being for a time duration dynamically regulated as a function of a correct or incorrect forecast of a next zero-cross instant;

closing for a predetermined time beginning with a switching instant of the first logic signal a short-circuiting switch for inputs of the differential amplifier of the at least one zero-crossing detecting circuit using a second logic signal;

enabling an asserting logic gate of a zero-cross event detected by the zero-cross detecting circuit starting from an instant of re-opening of the short-circuiting switch using a third logic signal; and resetting the first logic signal and the third logic signal a period of time after the interrupting.

16. A method according to claim 15, wherein the step of resetting occurs after a period of time proportional to an instantaneous speed of the motor.

17. A method according to claim 15, wherein the step of resetting occurs upon an output of an assertion signal of a zero-cross detection by the asserting logic gate.

18. A method according to claim 15, further comprising the step of coupling each phase winding to a respective zero-cross detecting circuit.

19. A method according to claim 15, wherein the step of interrupting comprises causing the first logic signal to have a constant and predetermined duration.

20. A method according to claim 19, wherein the step of causing the first logic signal to have Ea constant and predetermined duration comprises causing the first logic signal to have a duration equivalent to a constant and predetermined percentage of a phase switching frequency of the motor.

21. A system for driving a multi-phase brushless motor of a type comprising a plurality of phase windings and a rotor, the system comprising:

a plurality of power driver stages, each for driving respective phase windings of the motor;

storage means for storing digitized samples of driving waveforms for the phase windings;

a plurality of digital/analog converters for converting digital values of samples into an analog driving signal;

synchronizing means for synchronizing conversions of samples read from said storage means with a signal representative of a position of the rotor of the motor;

logic means for reconstructing a plurality of mutually out-of-phase sequences of the driving waveforms from the samples;

said synchronizing means further comprising a detecting circuit for sensing at least a zero-cross of at least a back-electromotive-force signal induced on a phase winding, said detecting circuit comprising a differential amplifier and a short-circuiting switch for short-circuiting inputs of said differential amplifier;

first logic means for generating a first logic command for setting in a condition of high impedance at an output of a respective power driver stage for the phase winding, second logic means for generating a second logic command for closing for a constant and predetermined interval of time starting from the switching instant of the first logic command the short-circuit switch, a logic gate for generating a zero-cross assertion signal, and third logic means for generating a third logic command for enabling an output of the zero-cross assertion signal by said logic gate starting from an instant when the short-circuiting switch re-opens at the end of the predetermined interval of time, said first and third logic means resetting the first and third logic commands after a certain interval of time.

22. A system according to claim 21, wherein said first and third logic means comprise means for resetting the first and third logic commands after a period of time proportional to an instantaneous speed of the motor.

23. A system according to claim 21, wherein said first and third logic means comprise means for resetting the first and third logic commands upon an output of the assertion signal by said logic gate.

24. A system according to claim 21, wherein said first logic means comprises means for causing the first logic command to have a constant and predetermined duration.

25. A system according to claim 24, wherein said means for causing comprises means for causing the first logic command to have a duration equivalent to a constant and predetermined percentage of a phase switching frequency of the motor.

26. A system according to claim 21, wherein said first logic means comprises means for interrupting for a time duration dynamically regulated as a function of a correct or incorrect forecast of a next zero-cross instant.

27. A method for sensing position of a rotor of a multi-phase brushless motor using at least one zero-cross detecting circuit for voltage induced on a respective phase winding of the motor driven in a multi-polar mode using at least one driving stage, the at least one zero-cross detecting circuit comprising a comparator, the method comprising the steps of:

interrupting a driving current of at least one of the phase windings of the motor coupled to a respective zero-cross detecting circuit by placing in a high impedance state an output of a respective driving stage using a first logic signal;

enabling an asserting logic gate of a zero-cross event detected by the zero-cross detecting circuit starting a certain time after interrupting the driving current using a third logic signal; and resetting the first logic signal and the third logic signal a period of time after the interrupting.

28. A method according to claim 27, wherein the step of resetting occurs after a period of time proportional to an instantaneous speed of the motor.

29. A method according to claim 27, wherein the step of resetting occurs upon an output of an assertion signal of a zero-cross detection by the asserting logic gate.

30. A method according to claim 27, further comprising the step of coupling each phase winding to a respective zero-cross detecting circuit.

31. A method according to claim 27, wherein the step of interrupting comprises causing the first logic signal to have a constant and predetermined duration.

32. A method according to claim 31, wherein the step of causing the first logic signal to have a constant and predetermined duration comprises causing the first logic signal to have a duration equivalent to a constant: and predetermined percentage of a phase switching frequency of the motor.

33. A method according to claim 27, wherein the step of interrupting is for a time duration dynamically regulated as a function of a correct or incorrect forecast of a next zero-cross instant.

34. A method for sensing position of a rotor of a multi-phase brushless motor using a zero-cross detecting circuit for respective phase windings of the motor driven in a multi-polar mode by respective driving stages, the method comprising the steps of:

interrupting driving of at least one of the phase windings of the motor by placing in a high impedance state an output of a respective driving stage using a first logic signal;

enabling an asserting logic gate of a zero-cross event detected by the zero-cross detecting circuit starting a certain time after the interruption of the driving current using a third logic signal; and resetting the first logic signal and the third logic signal a period of time after the interrupting.

35. A method according to claim 34, wherein the step of resetting occurs after a period of time proportional to an instantaneous speed of the motor.

36. A method according to claim 34, wherein the step of resetting occurs upon an output of an assertion signal of a zero-cross detection by the asserting logic gate.

37. A method according to claim 34, further comprising the step of coupling each phase winding to a respective zero-cross detecting circuit.

38. A method according to claim 34, wherein the step of interrupting comprises causing the first logic signal to have a constant and predetermined duration.

39. A method according to claim 38, wherein the step of causing the first logic signal to have a constant and predetermined duration comprises causing the first logic signal to have a duration equivalent to a constant and predetermined percentage of a phase switching frequency of the motor.

40. A method according to claim 34, wherein the step of interrupting is for a time duration dynamically regulated as a function of a correct or incorrect forecast of a next zero-cross instant.

41. A method of sensing a position of a rotor of a multi-phase brushless motor using at least one zero-cross detecting circuit for a respective phase winding of the motor driven in a multi-polar mode using at least one driving stage, the method comprising the steps of:

interrupting driving of at least one of the phase windings of the motor by placing in a high impedance state an output of a respective driving stage by means of a first logic signal, the interrupting being for a time duration dynamically regulated as a function of a correct or incorrect: forecast of a next zero-cross instant;

enabling an asserting logic gate of a zero-cross event detected by the zero-cross detecting circuit starting a certain time after the interruption of the driving current by means of a third logic signal; and resetting the first logic signal and the third logic signal a period of time after the interrupting.

42. A method according to claim 41, wherein the step of resetting occurs after a period of time proportional to an instantaneous speed of the motor.

43. A method according to claim 41, wherein the step of resetting occurs upon an output of an assertion signal of a zero-cross detection by the asserting logic gate.

44. A method according to claim 41, further comprising the step of coupling each phase winding to a respective zero-cross detecting circuit.

45. A method according to claim 41, wherein the step of interrupting comprises causing the first logic signal to have a constant and predetermined duration.

46. A method according to claim 45, wherein the step of causing the first logic signal to have a constant and predetermined duration comprises causing the first logic signal to have a duration equivalent to a constant and predetermined percentage of a phase switching frequency of the motor.

47. A system for driving a multi-phase brushless motor of,a type comprising a plurality of phase windings and a rotor, the system comprising:

a plurality of power driver stages, each for driving respective phase windings of the motor;

storage means for storing digitized samples of driving waveforms for the phase windings;

a plurality of digital/analog converters for converting digital values of samples into an analog driving signal;

synchronizing means for synchronizing conversions of samples read from said storage means with a signal representative of a position of the rotor of the motor;

logic means for reconstructing a plurality of mutually out-of-phase sequences of the driving waveforms from the samples;

said synchronizing means further comprising a detecting circuit for sensing at least a zero-cross of at least a back-electromotive-force signal induced on a phase winding, said detecting circuit comprising a comparator connected to the phase winding, first logic means for generating a first logic command for setting in a condition of high impedance at an output of a respective power driver stage for the phase winding, a logic gate connected to said comparator for generating a zero-cross assertion signal, and third logic means for generating a third logic command for enabling an output of the zero-cross assertion signal by said logic gate starting a certain time after the interruption of the driving current, said first and third logic means resetting the first and third logic commands after a certain interval of time.

48. A system according to claim 47, wherein said first and third logic means comprise means for resetting the first and third logic commands after a period of time proportional to an instantaneous speed of the motor.

49. A system according to claim 47, wherein said first and third logic means comprise means for resetting the first and third logic commands upon an output of the assertion signal by said logic gate.

50. A system according to claim 47, wherein said first logic means comprises means for causing the first logic command to have a constant and predetermined duration.

51. A system according to claim 50, wherein said means for causing comprises means for causing the first logic command to have a duration equivalent to a constant and predetermined percentage of a phase switching frequency of the motor.

52. A system according to claim 47, wherein said first logic means comprises means for interrupting for a time duration dynamically regulated as a function of a correct or incorrect forecast of a next zero-cross instant.

* * * * *

UNITED STATES PATENT AND TRADEMARK OFFICE
CERTIFICATE OF CORRECTION

PATENT NO. : 5,969,491
DATED : October 19, 1999
INVENTOR(S) : Viti et al.

It is certified that error appears in the above-identified patent and that said Letters Patent is hereby corrected as shown below:

Column 2, line 31    Strike: "set co"
                     Insert: --set to--

Column 3, line 4     Strike: "of a."
                     Insert: --of a--

Column 5, line 57    Strike: "than It"
                     Insert: --than its--

Column 10, line 19   Strike: "have Ea"
                     Insert: --have a--

Column 12, line 62   Strike: "of, a"
                     Insert: --of a--

Signed and Sealed this

Sixth Day of June, 2000

Attest:

Q. TODD DICKINSON

Attesting Officer    Director of Patents and Trademarks

UNITED STATES PATENT AND TRADEMARK OFFICE
CERTIFICATE OF CORRECTION

PATENT NO. : 5,969,491
DATED : October 19, 1999
INVENTOR(S) : Marco Viti, Michele Boscolo, Alberto Salina It is certified that error appears in the above-identified patent and that said Letters Patent is hereby corrected as shown below:

In the Drawings:

| | |
|---|---|
| Figure 3A | Delete: "PRIOR ART" |
| Figure 3B | Delete: "PRIOR ART" |
| Figure 3C | Delete: "PRIOR ART" |
| Figure 3D | Delete: "PRIOR ART" |

Signed and Sealed this

Thirtieth Day of January, 2001

Attest:

Q. TODD DICKINSON

Attesting Officer     Director of Patents and Trademarks

UNITED STATES PATENT AND TRADEMARK OFFICE
CERTIFICATE OF CORRECTION

PATENT NO. : 5,969,491
APPLICATION NO. : 09/115055
DATED : October 19, 1999
INVENTOR(S) : Viti et al.

Page 1 of 1

It is certified that error appears in the above-identified patent and that said Letters Patent is hereby corrected as shown below:

Claim 32            Delete: "constant:"
Column 11, Line 50  Insert: -- constant --

Signed and Sealed this

Eighth Day of April, 2008

JON W. DUDAS
*Director of the United States Patent and Trademark Office*